(12) United States Patent
Glover

(10) Patent No.: US 12,352,541 B2
(45) Date of Patent: Jul. 8, 2025

(54) LAYER COMPOSITE DOOR SYSTEMS

(71) Applicant: AADG, INC., New Haven, CT (US)

(72) Inventor: Daniel Brian Glover, Franklin, TN (US)

(73) Assignee: AADG, INC., New Haven, CT (US)

(*) Notice: Subject to any disclaimer, the term of this patent is extended or adjusted under 35 U.S.C. 154(b) by 581 days.

(21) Appl. No.: 16/999,738

(22) Filed: Aug. 21, 2020

(65) Prior Publication Data

US 2021/0055080 A1 Feb. 25, 2021

Related U.S. Application Data

(60) Provisional application No. 62/890,978, filed on Aug. 23, 2019.

(51) Int. Cl.
*F41H 5/04* (2006.01)
*B32B 5/02* (2006.01)
(Continued)

(52) U.S. Cl.
CPC ............. *F41H 5/0478* (2013.01); *B32B 5/02* (2013.01); *B32B 5/18* (2013.01); *B32B 5/26* (2013.01);
(Continued)

(58) Field of Classification Search
CPC ......... F41H 5/0478; F41H 5/226; B32B 5/02; B32B 5/18; B32B 5/26; B32B 15/14;
(Continued)

(56) References Cited

U.S. PATENT DOCUMENTS 2,541,871 A 2/1951 Gustaf et al.
2,818,947 A 1/1958 Goldberg
(Continued)

FOREIGN PATENT DOCUMENTS

GB 2258685 A 2/1993
WO 2013092626 A1 6/2013
WO 2018063986 A1 4/2018

OTHER PUBLICATIONS

Maxineasa et al. "Life cycle analysis of strengthening concrete beams with FRP" section 24.3.1.4 Basalt Fibers—retrieved via Science Direct topic overview "Basalt Fiber" on Mar. 20, 2023 (Year: 2018).*

(Continued)

*Primary Examiner* — Alicia J Weydemeyer
*Assistant Examiner* — Laura B Figg
(74) *Attorney, Agent, or Firm* — Moore & Van Allen PLLC; Jeffrey R. Gray

(57) ABSTRACT

Composite door systems that are configured for providing safety, security, and resistance to physical impacts or threats (natural and man-caused), and which can be utilized in barrier structures, such as for doors. The composite door systems may include one or more layers, each of which may have one or more fiber layers, such as fabric layers or plastic layers. The composite door systems may further include one or more additional layers of a sheet material, a fill material, or the like. The composite door systems are infinitely customizable and configured to be adapted to a variety of applications, and scalable levels of protection.

20 Claims, 11 Drawing Sheets

(51) Int. Cl.
  *B32B 5/18* (2006.01)
  *B32B 5/26* (2006.01)
  *B32B 15/14* (2006.01)
  *B32B 15/18* (2006.01)
  *B32B 27/12* (2006.01)
  *B32B 27/30* (2006.01)
  *B32B 27/32* (2006.01)
  *F41H 5/22* (2006.01)

(52) U.S. Cl.
  CPC .............. *B32B 15/14* (2013.01); *B32B 15/18* (2013.01); *B32B 27/12* (2013.01); *B32B 27/302* (2013.01); *B32B 27/32* (2013.01); *F41H 5/226* (2013.01); *B32B 2262/10* (2013.01); *B32B 2307/558* (2013.01)

(58) Field of Classification Search
  CPC ....... B32B 15/18; B32B 27/12; B32B 27/302; B32B 27/32; B32B 2262/10; B32B 2307/558
  See application file for complete search history.

(56) References Cited

U.S. PATENT DOCUMENTS

| | | | |
|---|---|---|---|
| 2,869,695 | A | 1/1959 | Herr et al. |
| 3,060,522 | A | 10/1962 | Parker |
| 3,083,798 | A | 4/1963 | Sklar |
| 3,239,978 | A | 3/1966 | Parker |
| 3,546,841 | A | 12/1970 | Smith et al. |
| 3,834,101 | A | 9/1974 | Wilder et al. |
| 3,886,688 | A | 6/1975 | Ragland |
| 4,223,494 | A | 9/1980 | Wendt |
| 4,719,729 | A | 1/1988 | Wynar |
| 5,441,779 | A | 8/1995 | Lafond |
| 5,447,761 | A | 9/1995 | Lafond |
| 5,528,865 | A | 6/1996 | Johnson et al. |
| 5,619,823 | A | 4/1997 | Ruff et al. |
| 8,955,254 | B1 | 2/2015 | Ewoldt |
| 10,060,181 | B1 | 8/2018 | Jones, Jr. et al. |
| 10,774,576 | B1 | 9/2020 | Vonnahme et al. |
| 2001/0003889 | A1 | 6/2001 | Zen |
| 2003/0200714 | A1 | 10/2003 | Minke et al. |
| 2007/0094935 | A1 | 5/2007 | Molinari |
| 2008/0016820 | A1 | 1/2008 | Robbins et al. |
| 2010/0024309 | A1 | 2/2010 | Tavarez |
| 2010/0257802 | A1 | 10/2010 | Strickland et al. |
| 2011/0227743 | A1 | 9/2011 | Kilbourne |
| 2011/0232192 | A1 | 9/2011 | Miller |
| 2013/0255183 | A1 | 10/2013 | Briggs, Jr. et al. |
| 2014/0360416 | A1 | 12/2014 | Deiler |
| 2015/0268010 | A1* | 9/2015 | Strauss ................ F41H 5/0478 89/36.02 |
| 2015/0369568 | A1* | 12/2015 | Nielsen ................ F41H 5/0471 89/36.01 |
| 2018/0051508 | A1 | 2/2018 | Glover |
| 2018/0066429 | A1 | 3/2018 | Yau et al. |
| 2018/0087315 | A1 | 3/2018 | Glover |
| 2018/0313123 | A1* | 11/2018 | Kenyon ................ E05D 11/087 |
| 2018/0320435 | A1 | 11/2018 | Bertovic |
| 2021/0246710 | A1 | 8/2021 | Ko |

OTHER PUBLICATIONS

AADG, Inc., International Patent Application No. PCT/US2020/047452, International Preliminary Report on Patentability, Mar. 3, 2022.

AADG, Inc., International Patent Application No. PCT/US2020/047452, International Search and Written Opinion, May 28, 2021.

Foamtech North America Ltd., Alufoam, 1 page.

Firestone Fibers & Textiles Company, Product Code: Basalt—Innegra Woven Fabric (FIR-BIT78-60), 1 page.

Honeywell, Spectra®, Technology / Innovation / Investigation VOC: Ultra-Light Weight Ballistic Protection—Fabrics / Sheet Materials, Jan. 21, 2020, 5 pages.

Ray-Bar Ultra-Light Weight UL 752 Level 8 Ballistic Panel, https://www.raybar.com/ballistic-products/ray-bar-ballistic-resistant-metal-doors, 1 page.

Skarr Armor, High Strength UHMWPE Ballistic Fabric 48"x65" NIJ IIIA Capable, 1 page.

AADG, Inc. Canadian Patent Application No. 3,147,200, Office Action, Sep. 11, 2023.

AADG, Inc. Canadian Patent Application No. 3,147,200, Office Action, Apr. 12, 2024.

* cited by examiner

122

122

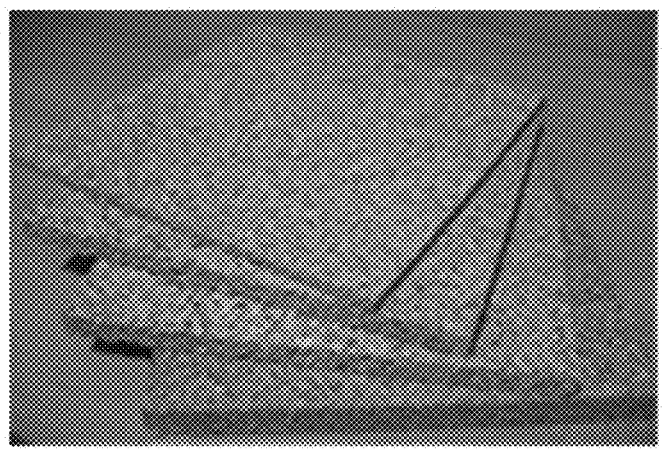
*FIG.* 2c
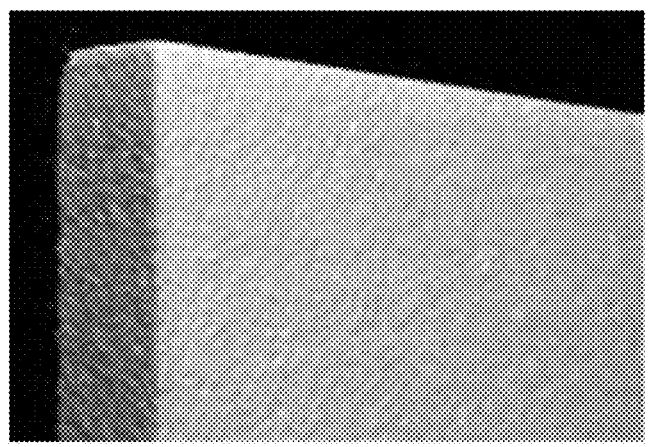
*FIG.* 2d

LAYER COMPOSITE DOOR SYSTEMS

CROSS REFERENCE AND PRIORITY CLAIM UNDER 35 U.S.C. § 119

The present Application for a Patent claims priority to U.S. Provisional Patent Application Ser. No. 62/890,978 entitled "Composite Door Systems," filed on Aug. 23, 2019 and assigned to the assignees hereof and hereby expressly incorporated by reference herein.

FIELD

Embodiments of the present disclosure generally relate to barrier structures and assemblies that are typically used in building construction, such as doors. In particular, embodiments of the disclosure relate to a composite door system comprising numerous layers with enhanced structural and performance characteristics.

BACKGROUND

Dwellings, buildings, or other like barrier structures, typically comprise doors, walls, floors, roofs, partitions, etc. Moreover, in many instances, it is desirable that the barrier structures provide safety, security, resistance from the elements, such as but not limited to providing protection from extreme weather conditions, unauthorized access by users, or the like. Hence, the barrier structures should be able to withstand and resist a variety of physical impacts. Conventional concrete and reinforced concrete structures, in particular Forced Entry and Bullet Resistant (FEBR) doors, are not only extremely heavy, costly to transport, undesirably bulky and dangerous during manufacture, transport, installation, and use (e.g., if they fail during use), they may also be deficient in providing the desired protection from physical impacts (e.g., projectile penetration, explosions, noise, fire, or the like).

SUMMARY

As will be described herein, a composite door system (or otherwise described as a hybrid door system) of the present disclosure is configured for providing resistance to, and protection from, physical impacts, such as penetration from projectiles, as well as protection from fire, physical attacks, explosions, noise, medium and radio frequency radiation, etc. The composite door systems can be utilized in a variety of applications, such as in different types of barriers, such as buildings, partitions, walls, or the like. The composite door systems may comprise a first layer, typically in the form of one or more fiber layers, such as fabric layers (e.g., one or more layers of woven or non-woven fabric operatively coupled together, or the like), plastic layers (e.g., one or more layers of polyethylene fibers, such as ultra-high molecular-weight polyethylene (UHMWPE), or the like), or other like fiber layers, as will be described in further detail herein. The composite door systems may comprise one or more additional layers of a porous sheet, a fill material, or the like as will be described herein. Additionally, the composite door systems may comprise one or more second, third, fourth, or the like layers (e.g., separate from the first layers), each of which may also be formed of one or more fiber layers, such as the fabric layers (e.g., one or more woven or non-woven fabric layers operatively coupled together, or the like), plastic layers (e.g., UHMWPE layers, or the like). As such, the composite door systems may have multiple separate groups of fabric layers (e.g., first, second, third, fourth, or the like grouping of layers), which may be separated by one or more additional layers of a porous sheets, fill material, or other like material layers. The one or more first, second, third, and/or the like layers may be made up of the one or more fiber (e.g., fabric layers, plastic layers, or the like) and may provide protection from physical impacts. The composite door systems may be infinitely customizable and can be adapted to a variety of applications based on the application and needs of the various installations.

One embodiment of the invention comprises a composite door system. The system comprises a first layer, wherein the first layer comprises a projectile resistant layer. The system further comprises one or more additional layers of a sheet material and/or a fill material. The system further comprises a shell, with the first layer and the one or more additional layers are located within at least a portion of the shell. The first layer provides projectile resistance.

In further accord with embodiments of the invention, the projectile resistant layer comprises one or more fiber layers.

In other embodiments of the invention, the one or more fiber layers comprise one or more plastic layers.

In still other embodiments of the invention, the one or more plastic layers are formed from polyethylene.

In yet other embodiments of the invention, the one or more plastic layers comprise ultra-high molecular-weight polyethylene (UHMWPE).

In other embodiments of the invention, the one or more fiber layers comprise one or more fabric layers.

In further accord with embodiments of the invention, the one or more fabric layers are formed from a solid mineral material.

In other embodiments of the invention, the one or more fabric layers are formed from basalt.

In still other embodiments of the invention, the one or more additional layers comprise one or more sheet layers operatively coupled to the one or more fiber layers.

In yet other embodiments of the invention, the one or more sheet layers comprise a porous foam sheet.

In other embodiments of the invention, the one or more additional layers comprise one or more fill material layers operatively coupled to the one or more fiber layers.

In further accord with embodiments of the invention, the fill material is a polystyrene, polyisocyanurate, polyurethane, fiberglass, cellulose, mineral wool, structured kraft paper, plastics, polycarbonates, vermiculite, perlite, cementitious foam (magnesium oxide, such as magnesium silicate), or phenolic foam material.

In other embodiments, the invention further comprises a second layer, wherein the second layer comprises one or more second fiber layers that provide additional projectile resistance.

In still other embodiments of the invention, the shell comprises a steel shell.

In yet other embodiments, the invention further comprises one or more hardware housings operatively coupled to the shell.

In other embodiments of the invention, the hardware housings comprise a channel member, a solid hardware housing, a case hardware housing, or a tubular hardware housing.

In further accord with embodiments, the invention further comprises one or mor projectile resistant materials operatively coupled to the one or more hardware housings, wherein the one or more projectile resistant materials comprises steel or one or more additional fiber layers.

In other embodiments of the invention, the shell comprises a first face and a second face, and the composite door system further comprises one or more support members operatively coupled to the first face or the second face of the shell.

Other embodiments of the invention comprise composite core. The composite core comprises a first layer having one or more projectile resistant layers. The composite core comprises one or more additional layers of a sheet material and/or a fill material. The one or more projectile resistant layers provide projectile resistance.

Other embodiments of the invention comprise a method of forming a composite door system. The method comprises forming at least a portion of a shell and assembling one or more hardware housings to the shell. The method further comprises assembling a core comprising a first layer and one or more additional layers of a sheet material and/or a fill material. The first layer comprises one or more projectile resistant layers that provide projectile resistance.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1:
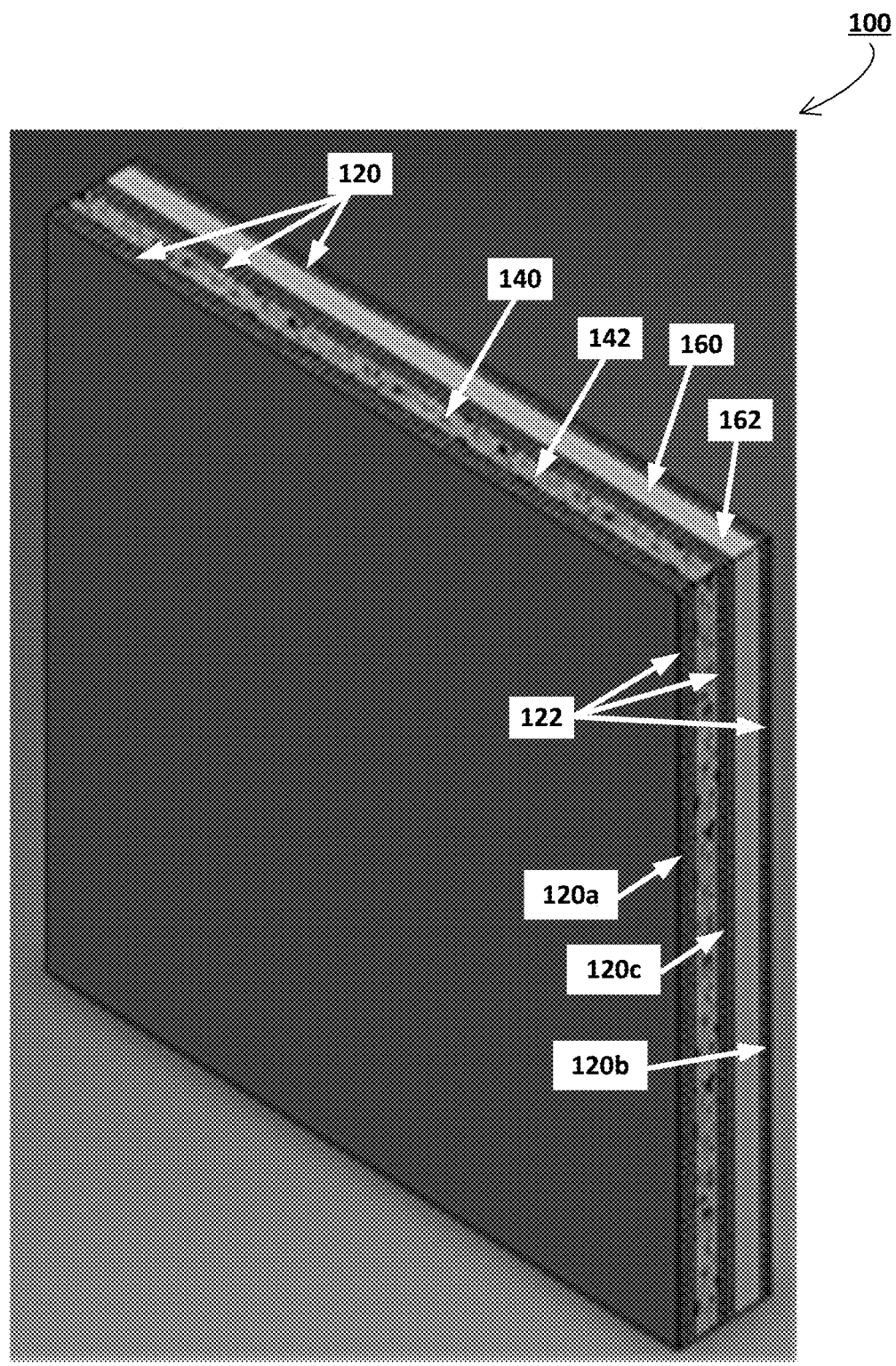

FIG. 1 is a perspective view of a composite door system, in accordance with some embodiments of the disclosure.

Figure 2A:
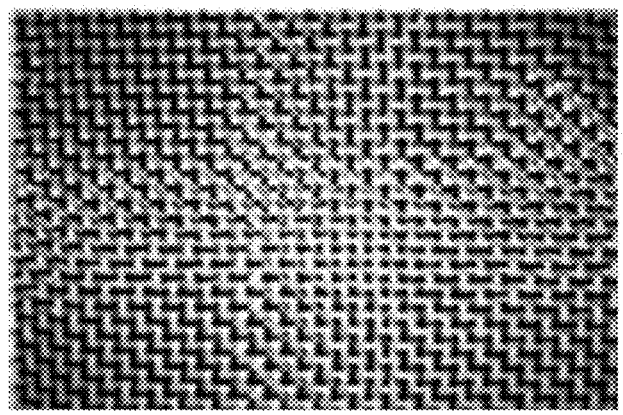

FIG. 2a is a view of a portion of a fabric layer, in accordance with some embodiments of the disclosure.

Figure 2B:
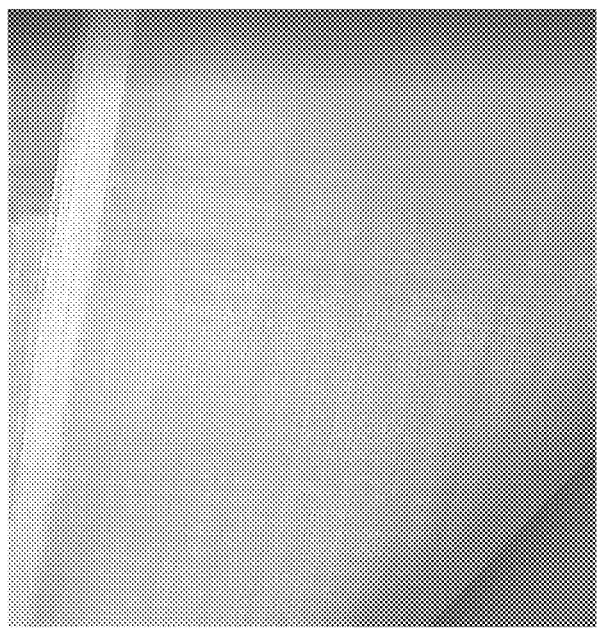

FIG. 2b is a perspective view of a plastic layer, in accordance with some embodiments of the disclosure.

FIG. 2c is a perspective view of porous sheets, in accordance with some embodiments of the disclosure.

FIG. 2d is a perspective view of a fill material, in accordance with some embodiments of the disclosure.

Figure 3:
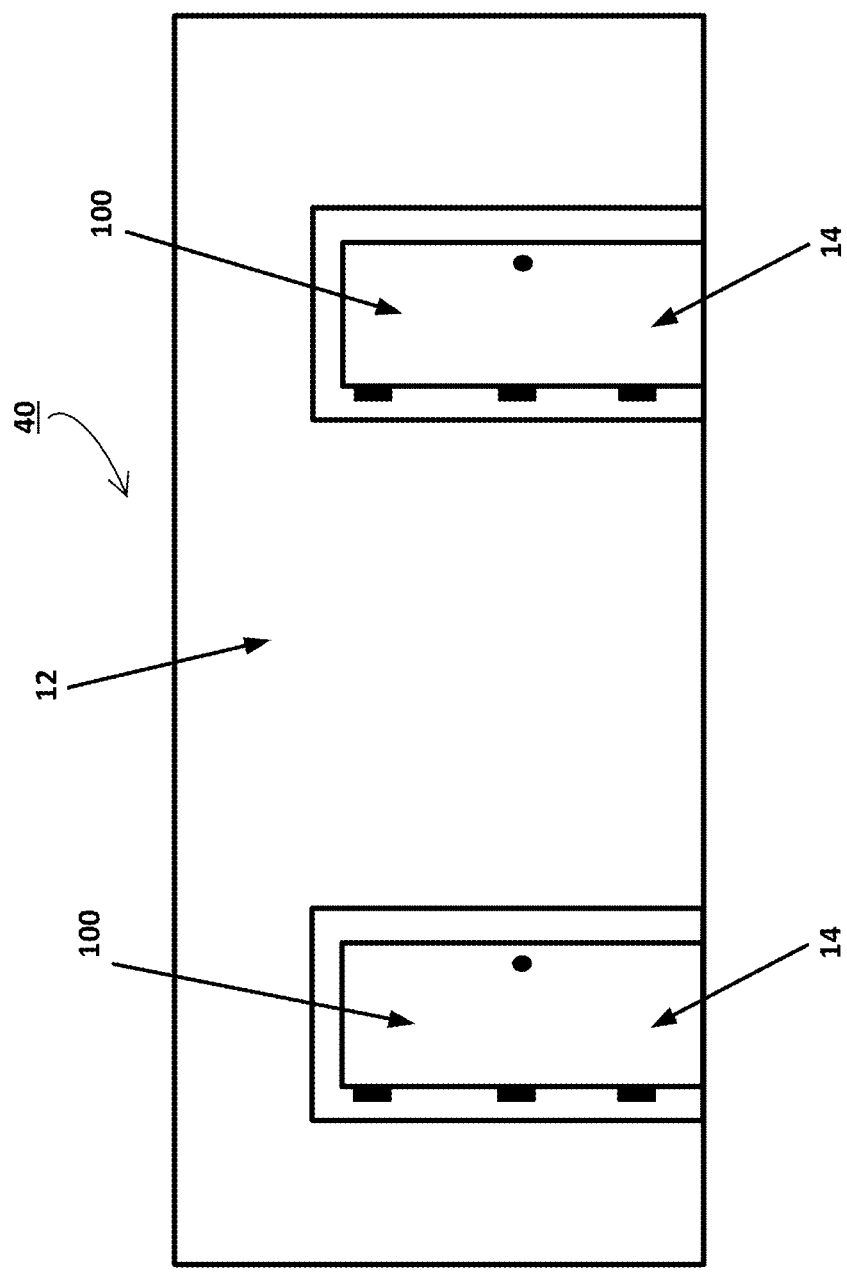

FIG. 3 is a front view of a barrier structure utilizing one or more composite door systems, in accordance with some embodiments of the disclosure.

Figure 4A:
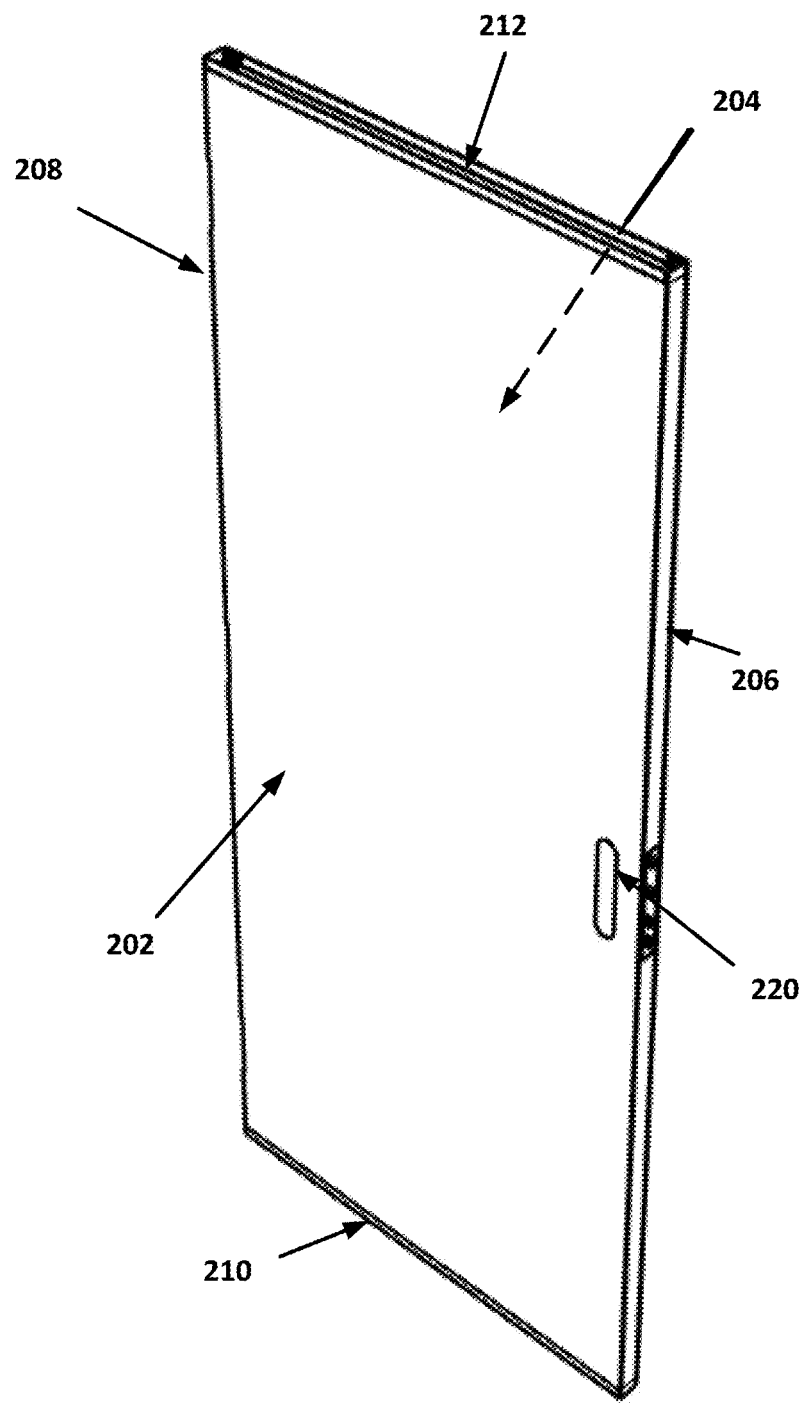

FIG. 4a is a perspective view of a composite door system including a hardware housing, in accordance with some embodiments of the disclosure.

Figure 4B:
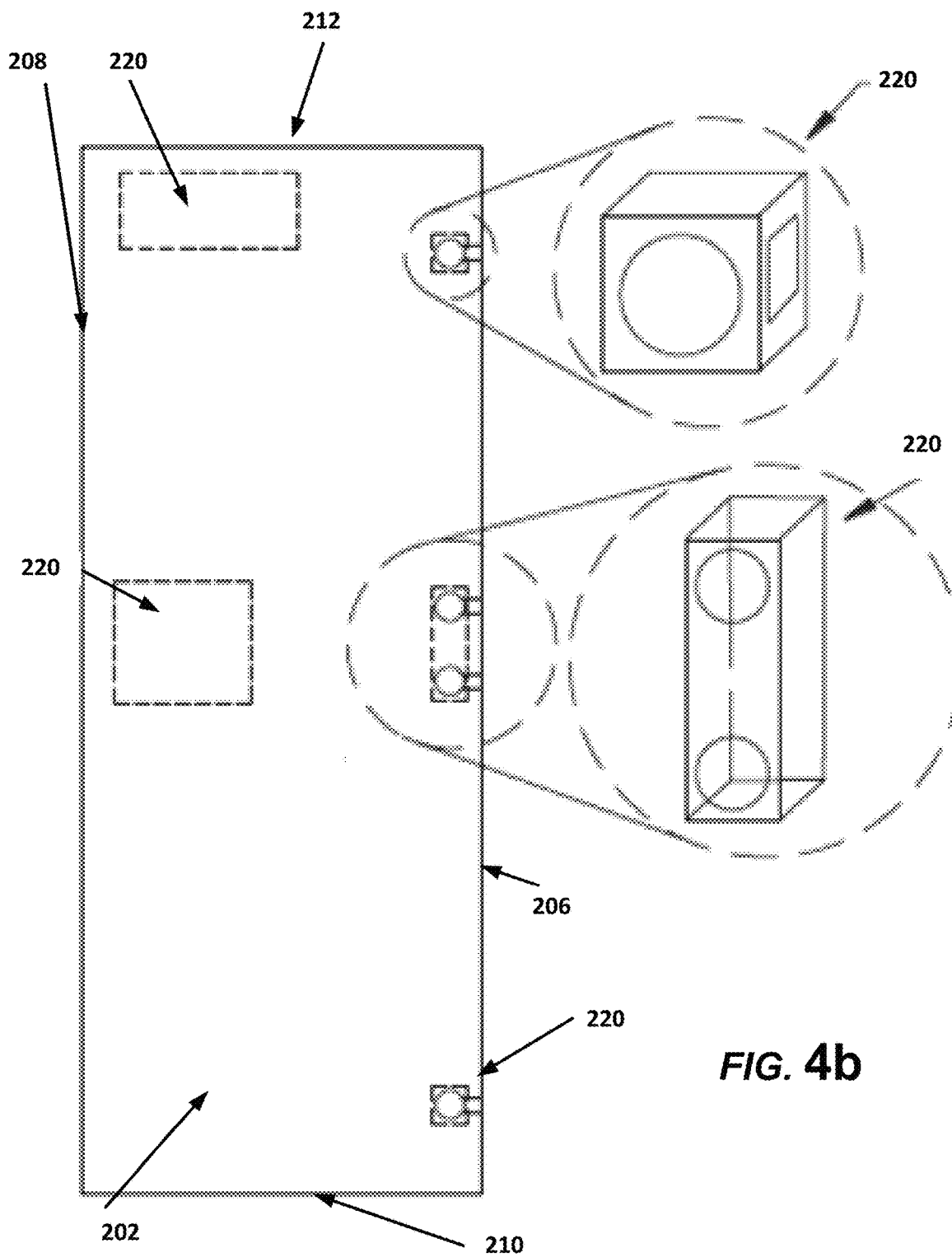

FIG. 4b is a front view of a composite door system including hardware housings, in accordance with some embodiments of the disclosure.

Figure 4C:
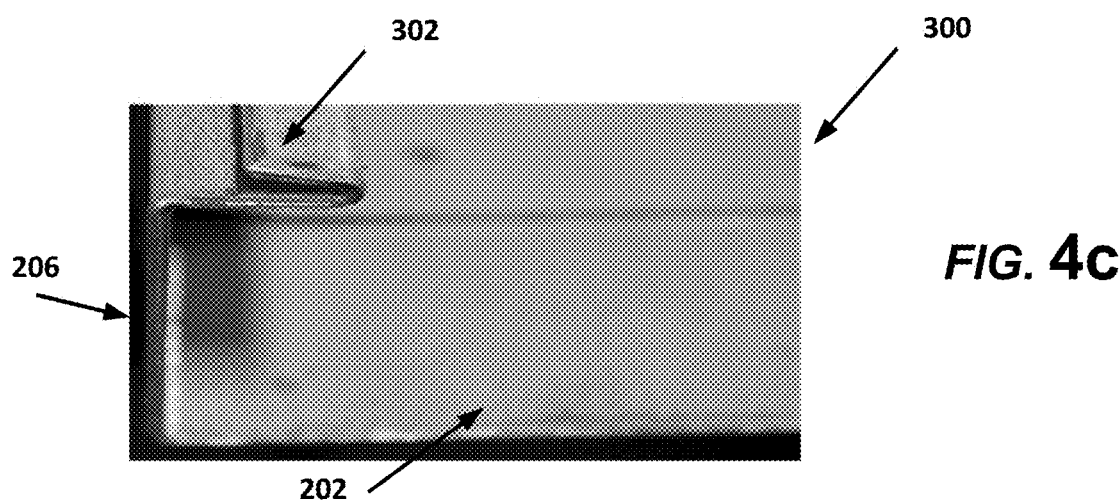

FIG. 4c is a perspective view of a portion of a composite door system having a hemmed shell, in accordance with some embodiments of the disclosure.

Figure 4D:
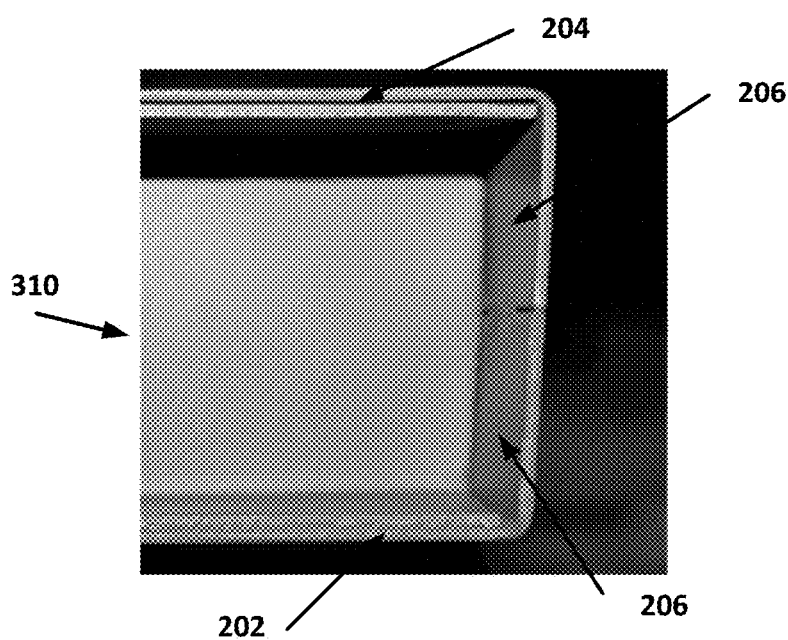

FIG. 4d is a perspective view of a portion of a composite door system having a butted shell, in accordance with some embodiments of the disclosure.

Figure 4E:
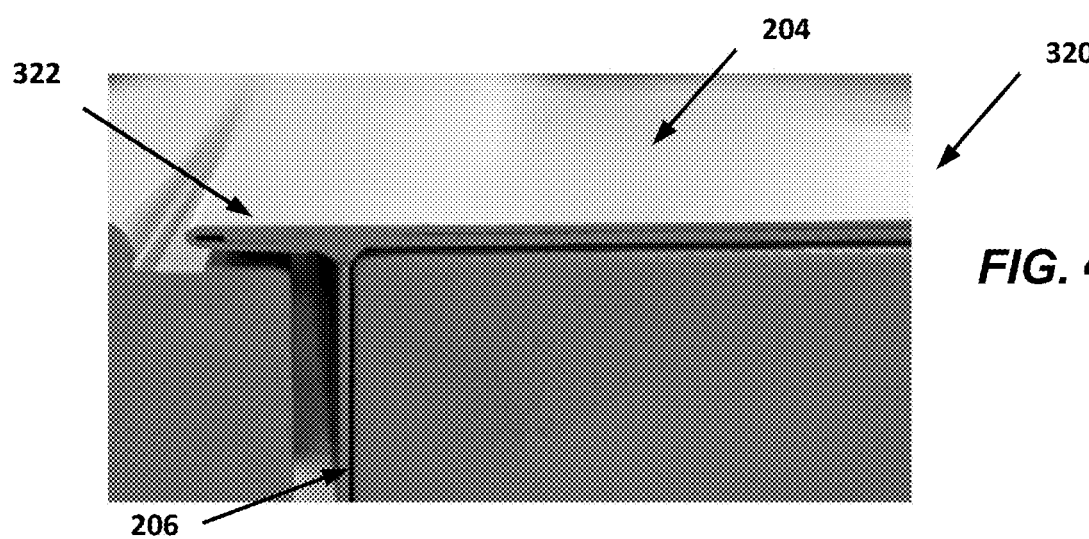

FIG. 4e is a perspective view of a portion of a composite door system having a rabbet shell, in accordance with some embodiments of the disclosure.

Figure 4F:
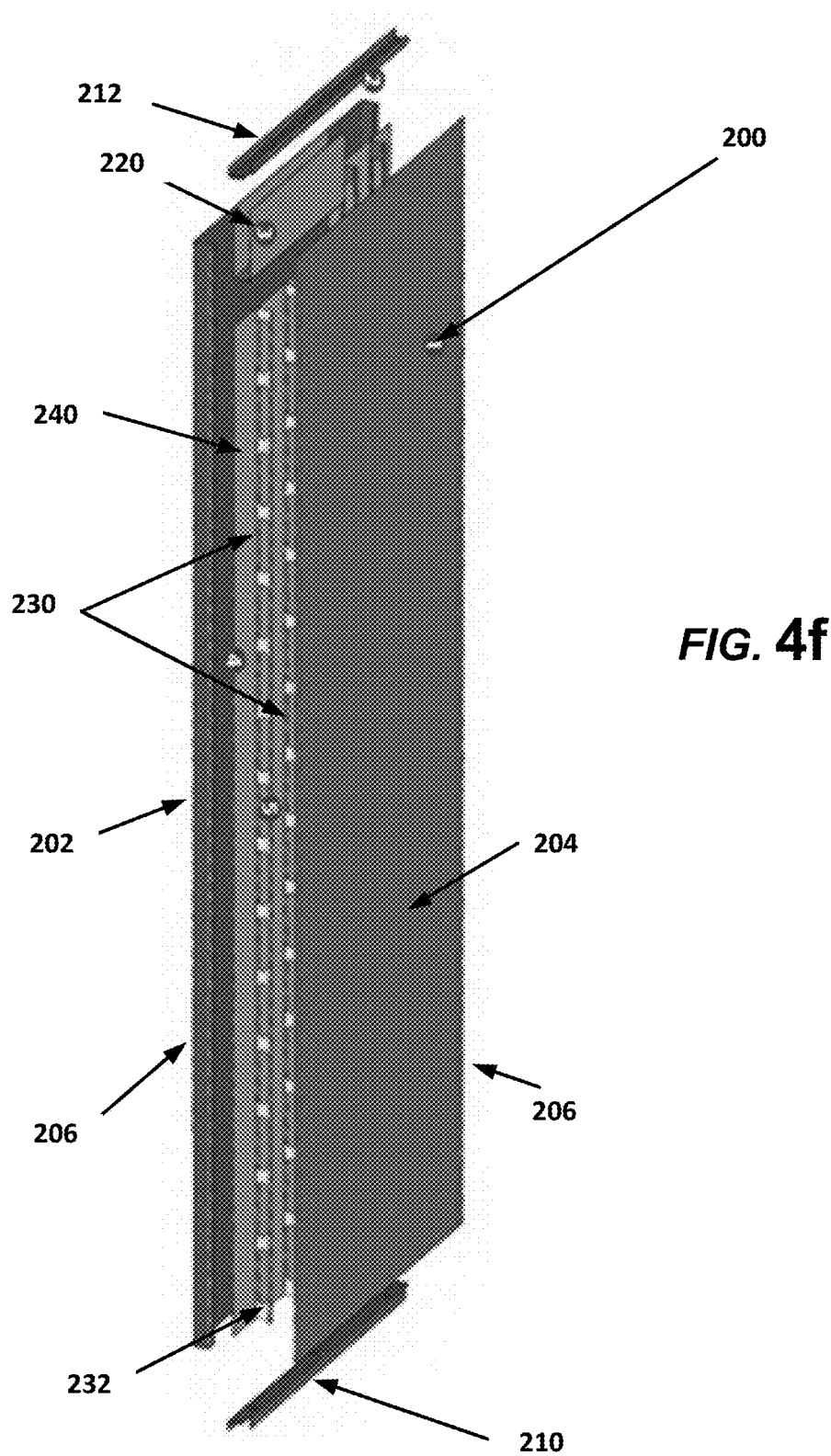

FIG. 4f is a perspective view of a composite door system, in accordance with some embodiments of the disclosure.

Figure 4G:
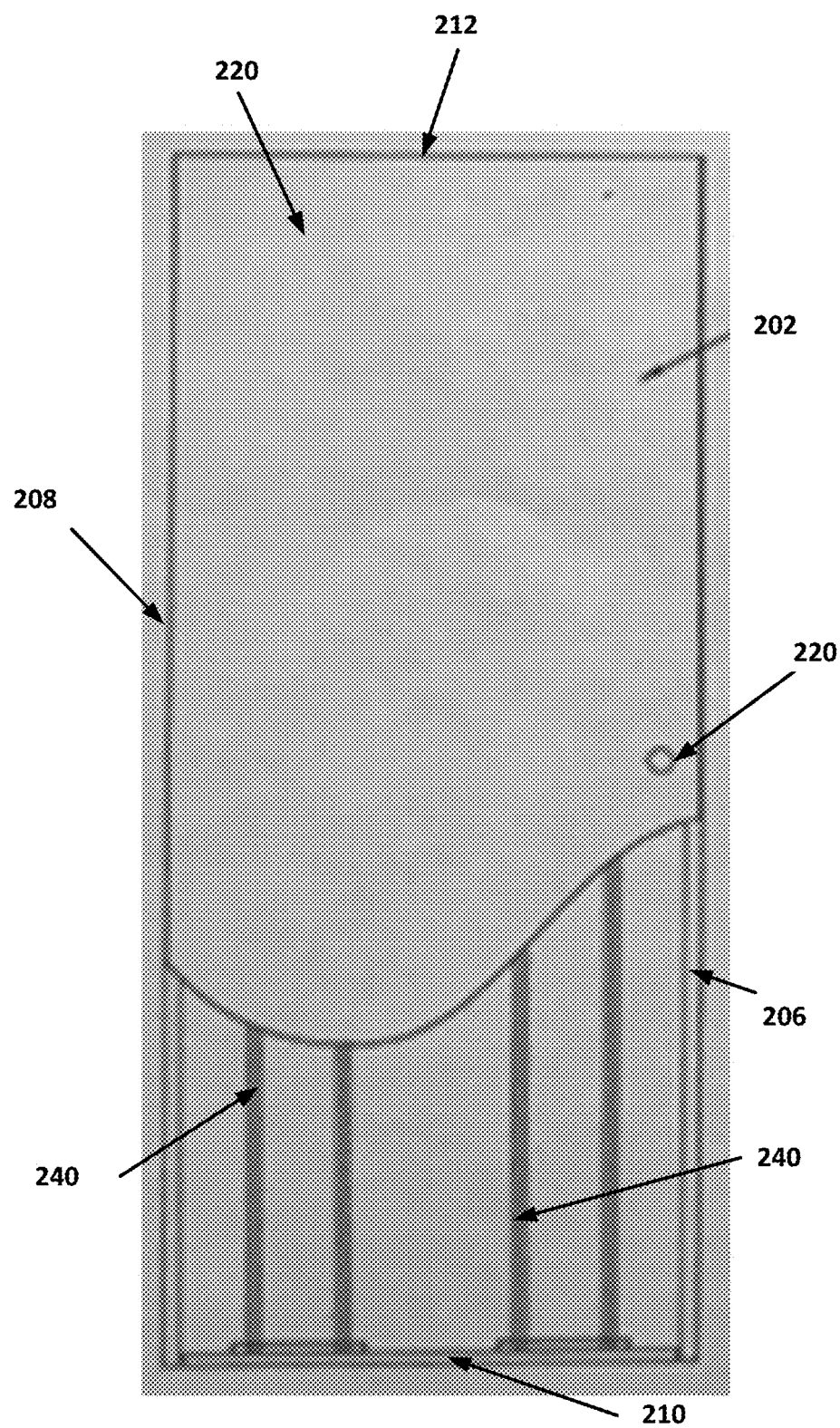

FIG. 4g is a front view of a composite door system, in accordance with some embodiments of the disclosure.

Figure 4H:
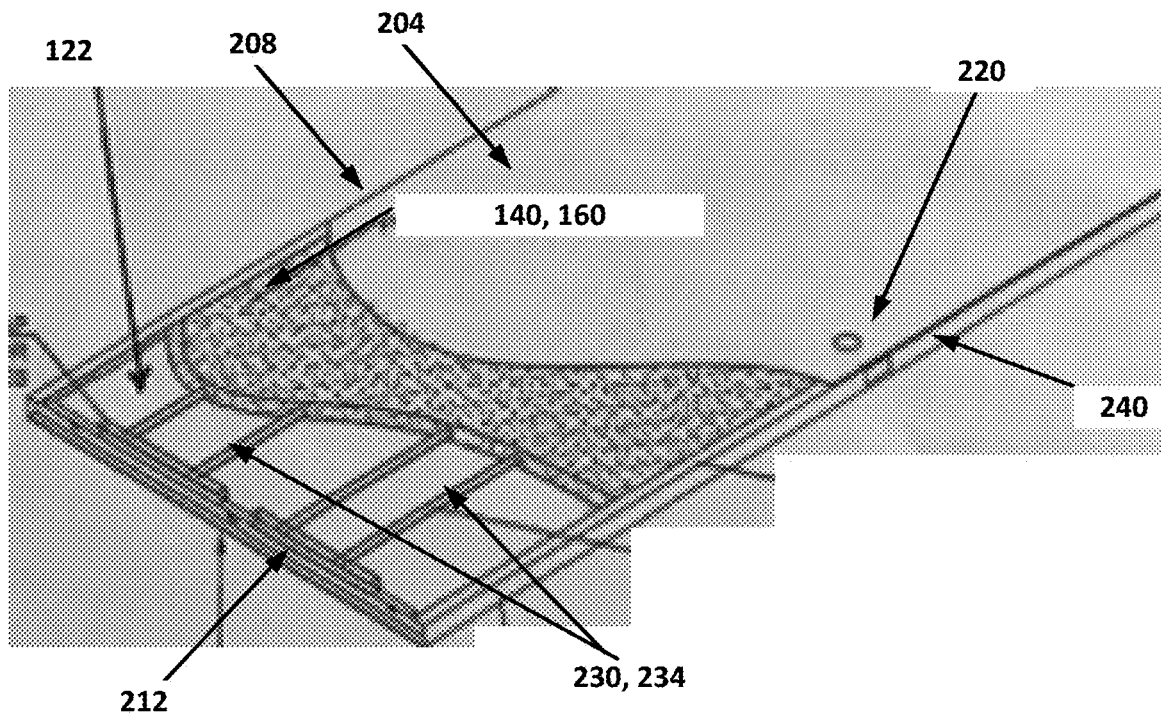

FIG. 4h is a perspective view of a composite door system of FIG. 4d, in accordance with some embodiments of the disclosure.

Figure 4I:
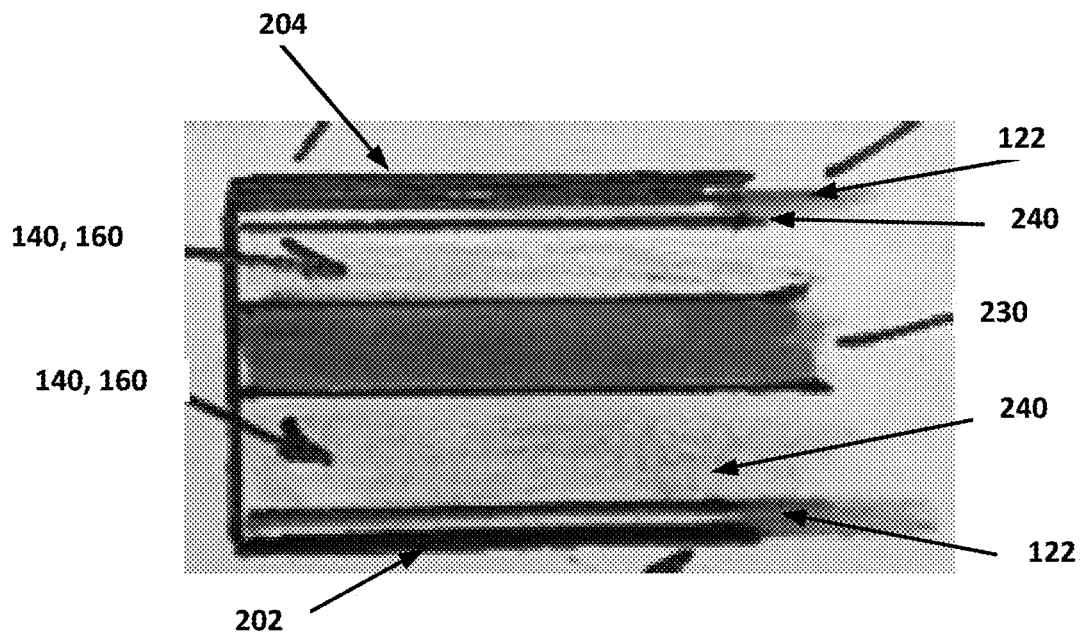

FIG. 4i is a cross sectional view of a composite door system, in accordance with some embodiments of the disclosure.

Figure 5:
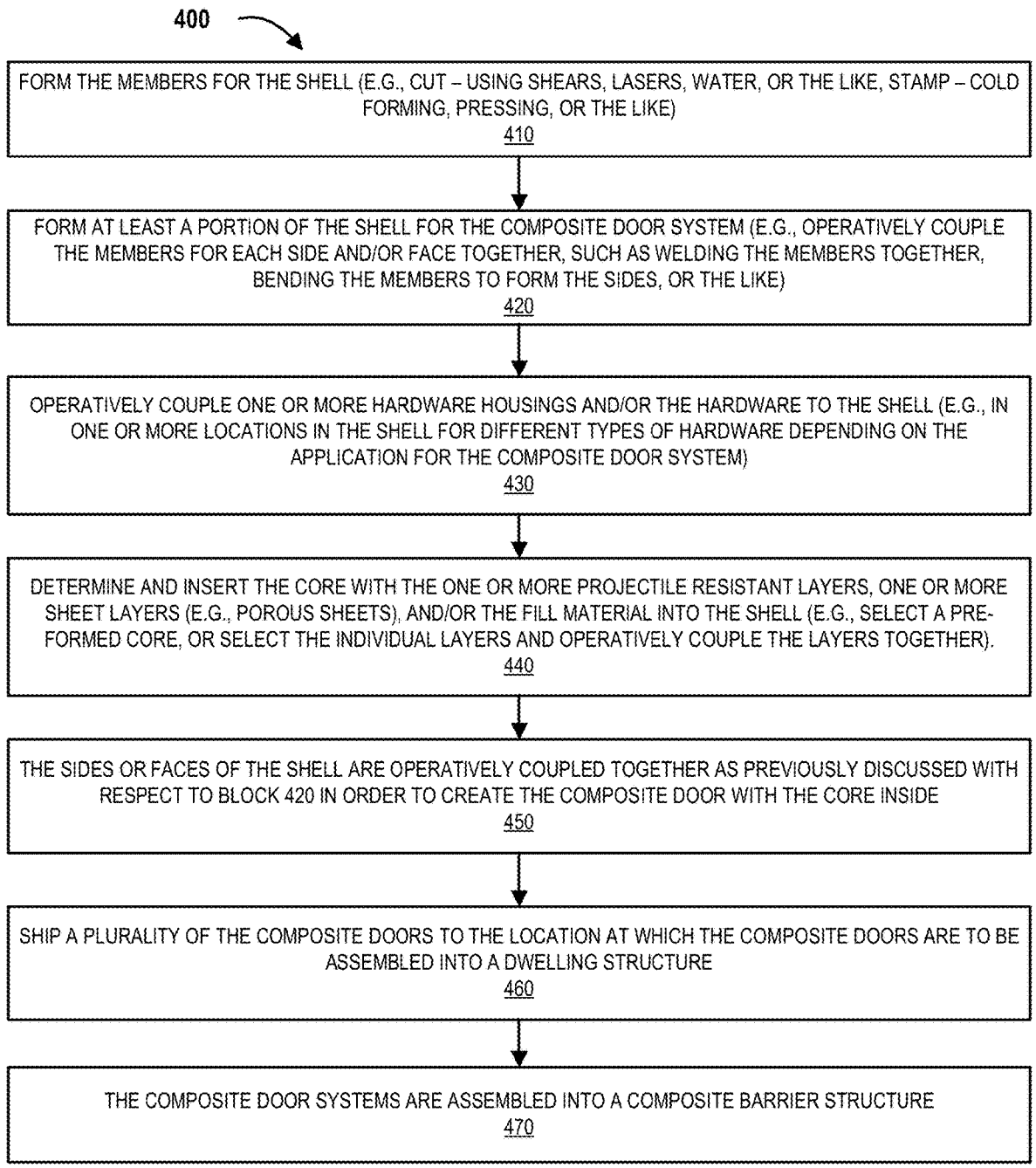

FIG. 5 is a process flow for forming, shipping, and installing the composite door system, in accordance with some embodiments of the disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof As illustrated in FIG. 1, the composite door system 100 may comprise (i) a first layer (e.g., a projectile resistant layer 120) formed from one or more fiber layers 122, and (ii) one or more additional layers of a sheet 140 (e.g., a porous sheet) and/or one or more additional layers of a fill material 160. Typically, the first layer 120 may comprise a single fiber layer 122 or a plurality of fiber layers 122. Each of the one or more fiber layers 122 may comprise, at least in part, a woven or non-woven fibers (e.g., textile fabrics, plastics, or the like).

With respect to fiber layers 122 that are fabric layers, the fabric layers may be manufactured by weaving, knitting or otherwise interlacing certain fibers. In some embodiments, the fabric layers comprise woven (or knitted or interlaced) mineral fibers, such as basalt fibers, in part or in its entirety. In other words, the fabric layer may be formed from a solid mineral, such as basalt. The fabric layer (e.g., the basalt fabric layer, or the like) may comprise a thickness in the range of about 0.005-0.1 inches. In some embodiments, the basalt fabric layer comprises a thickness of about 0.01, 0.015, 0.02, 0.025, 0.030 inches (+/−0.005) and a density of 0.03, 0.04, 0.05, 0.06, 0.07, 0.08, 0.09, 0.10 oz./sq. ft. (+/−0.005). However, it should be understood that the thickness of each of the one or more fabric layers may be any thickness, and/or have any density (e.g., range between, overlap, and/or fall outside of any of the forgoing values). While the fabric layers may be made, at least in part, from basalt, in other embodiments, at least a portion of the fabric layers may be made out of other minerals, metals, alloys, plastics, composites, organic materials, polymers, etc. It should be understood that the use of one or more fabric layers may aid is resisting physical impacts, as will be discussed in further detail herein.

With respect to plastic layers (e.g., non-woven UHMWPE, or the like), the plastic fibers may be formed into a sheet use a bonding material (e.g., resin, or other like bonding material). In some embodiments the plastic layers may comprise plastic fibers that are bonded with resin into a sheet. In other words, the plastic layer may be formed from a solid mineral (e.g., plastic fibers and resin), such as UHMWPE. The plastic layer (e.g., the UHMWPE layer, or the like) may comprise thicknesses that are the same as or similar to the thickness described with respect to the fabric layers discussed above. While the plastic layers may be made, at least in part, from UHMWPE, in other embodiments, at least a portion of the plastic layers 126 may be made out of other types of plastics, or metals, alloys, composites, organic materials, polymers, etc. It should be understood that the use of one or more plastic layers may aid is resisting physical impacts, as will be discussed in further detail herein.

It is noted that the one or more fiber layers 122 may form the first layer (e.g., a projectile resistant layer 120). In the instances where multiple fiber layers 122 form the first layer, the fiber layers 122 may all be the same or similar in terms of materials, fiber composition, fiber thickness, weave pattern, non-weave pattern, grain orientation, and other characteristics, or the fiber layers 122 may differ with respect to at least one characteristic. For example, the fiber layers 122 may be orientated in the same direction or may be orientated in different directions. That is, for example, successive fiber layers may be rotated any degree with respect to each other (e.g., in particular, when the fiber layers are woven and may have a pattern). As such, should the fiber layers 122 have a particular pattern, the fiber layers 122 may be orientated such that the fiber pattern does not line up between at least two of the fiber layers 122. It should be further understood that when a plurality of fiber layers 122 are used for the first layer, the plurality of fiber layers may be operatively coupled to each other in one or more various ways. For example, the fiber layers 122 may be mechanically coupled together, such as through the use of fasteners (e.g., rivets, pins, needles, or the like) that may be inserted through the fiber layers 122 (e.g., in some cases through the weaves of fabric layers, or the like). Additionally, or alternatively, the fiber layers 122 may be operatively coupled together through the use of an adhesive (e.g., glue, resin, epoxy, tape, or the like) that is applied to one or more opposing surfaces of the fiber layers 122. In other embodiments, the fiber layers 122 may be operatively coupled together by sandwiching the fiber layers between other layers that are operatively coupled together, by placing the fiber layers within a shell, and/or by bounding the fiber layers 122 with a string, ribbon, mesh, fabric, or other flexible material that may be wrapped around at least a portion of the fiber layers 122 in order to create the first layer (e.g., the projectile resistant layer 120).

It should be understood that the composite door system 100 may further comprise additional layers, each of which may comprise one or more fiber layers 122. For example, the composite door system 100 may have a second layer, third layer, fourth layer, or the like, each of which are formed from one or more fiber layers 122. In the instances where the composite door system 100 comprises multiple projectile resistant layers 120 of one or more fiber layers 122 (e.g., as illustrated by FIG. 1a in one example), each of the projectile resistant layers 120 may be the same or different with respect to the number of the fiber layers 122 therein, arrangement/ordering of the fiber layers 122 therein, characteristics of the fiber layers 122 therein, and/or the like. For instance, in some embodiments, a first layer 120a may comprise twelve (12) fiber layers 122, while a second layer 120b may comprise three (3) fiber layers 122 and a third layer 120c may also comprise three (3) fiber layers 122. As another example, in some embodiments, a first layer 120a may comprise six (6) fiber layers 122, while a second layer 120b may comprise a single fiber layer 122 and a third layer 120c may also comprise a single fiber layer 122. In some embodiment the first layer 120a may be a single fiber layer 122 and the second layer 120b may also be a single fiber layer 122. It is understood that the characteristics of the fiber layers 122, the number and arrangement of the fiber layers 122 in the layers 120, and the arrangement of the layers 120 may be customized based on the desired properties, such as the desired protective properties, of the composite door system 100.

Referring to the additional layers of the composite door systems, the one or more additional layers may comprise a sheet 140 (e.g., a porous sheet), which may typically comprise a material having a plurality of apertures in the form of voids, cavities, hollow interior chambers, surface hollows, slots, and/or through holes. This plurality of apertures may extend over a portion of a thickness, length, and/or width of the sheet 140, and/or they may extend over the entirety of the thickness, length, and/or width of the sheet 140. Additionally, the plurality of apertures may extend only partially into the sheet 140 (e.g., embossed into the sheet), or the plurality of apertures may be through holes. Moreover, in some embodiments, the sheet 140 may be a porous sheet, such as, a foam sheet 142. This foam sheet 142 may be made from a metal, such as aluminum or its alloys (as illustrated in FIG. 2b in some embodiments). The foam sheet 142 may comprise a thickness in the range of about 0.05 to 1.875 inches (or in some embodiments up to 3 inches or more for thicker doors). In some embodiments, the foam sheet 142 comprises a thickness of about 0.1, 0.15, 0.20, 0.25, 0.3, 0.35, 0.40, 0.45 to 0.70, 0.75, 0.80, 0.85, 0.9, 0.95, 1, 1.1, 1.2, 1.3, 1.4, 1.5, 1.6, 1.7, 1.8, 1.875, or more inches and a density of about 0.63 lbs./sq. ft (0.55, 0.57, 0.59, 0.61, 0.65, 0.67, 0.69, 0.71, or the like). However, it should be understood that the foam sheet 142 may have any thickness and/or any density (e.g., having a range that falls between, overlaps, and/or falls outside of any of the forgoing values). While the foam sheet 142 may be made of aluminum, in some embodiments, the foam sheet 142 is made from other metals, steel, alloys, minerals, plastics, composites, organic materials, polymers, etc. In some embodiments, the sheet 140 is a grating framework (illustrated in FIG. 2c made from suitable metals (e.g., aluminum), steel, alloys, minerals, plastics, composites, organic materials, polymers, etc.

With respect to the one or more additional layers of a fill material 160, the fill material 160 may comprise an undifferentiated whole structure, a collection of discrete structures, and/or combinations thereof. In the embodiments where the fill material 160 comprises an undifferentiated whole structure, the fill material 160 may be in the form of a solid or foamed sheet. In this regard, the fill material 160 may be a polystyrene sheet 162 (as illustrated in FIG. 2d in some embodiments, or other types of sheets as discussed herein) having a thickness in the range of about 0.1, 0.15, 0.20, 0.25, 0.3, 0.35, 0.40, 0.45 to 0.70, 0.75, 0.80, 0.85, 0.9, 0.95, 1, 1.1, 1.2, 1.3, 1.4, 1.5, 1.6, 1.7, 1.8, 1.875, or more. However, it should be understood that the fill material 160 may have any thickness (e.g., ranges between, overlaps, and/or falls outside of any of the forgoing values). In the embodiments where the fill material 160 comprises a collection of discrete structures, the fill material 160 may be in the form of pellets, spheroids, grains, etc. It should be understood that the fill material 160 may be a solid material, or it may be a liquid material that later becomes solid. In some embodiments, the fill material 160 may provide insulation for the composite door system 100.

The arrangement of the layers in the composite door system 100 will now be described in accordance with some embodiments of the invention. As illustrated in FIG. 1, in some embodiments, one or more additional layers of a sheet 140 and/or one or more additional layers of a fill material 160 may be positioned in between a first layer 120a, a second layer 120b, and a third layer 120c, each of which has one or more fiber layers 122. In other embodiments, a pair of layers 120 (e.g., a first layer 120a and a second layer 120b) may be positioned adjacent each other. In yet other embodiments, a sheet 140 (e.g., porous sheet) and a layer of a fill material 160 may be placed next to each other. That said, the one or more layers 120, each comprising one or more fiber layers 122, and the one or more additional layers comprising one or more sheets 140 and/or one or more filler layers 160 may be arranged in any suitable order and in any suitable combination, based on the desired application. In some embodiments, the one or more additional layers of a sheet 140 may be operatively coupled to the one or more fiber layers 122. In some embodiments, the one or more one or more filler layers 160 may be operatively coupled to the one or more fiber layers 122. It should be understood that the one or more layers 120, the one or more porous sheets 140, and/or the one or more filler layers 160 may be operatively coupled to each other as was previously described with respect to operatively coupling the multiple fiber layers 122 together (e.g., fasteners, adhesive, bounding, or the like).

Now referring to FIGS. 2a-2c, FIG. 2a illustrates a fabric layer 124 of a basalt fabric layer type, in accordance with some embodiments of the disclosure. As discussed previously, the fabric layer may be manufactured by weaving, knitting or otherwise interlacing certain fibers. In some embodiments, the fabric layer comprises woven (or knitted or interlaced) basalt fibers, or woven (or knitted or interlaced) yarns made from basalt fibers. In still other embodiments of the invention, the fabric layers may be formed of basalt fibers or yarns made from basalt fibers that non-woven, and as such, the fibers or yarns may be formed into a fiber layer using resin or another bonding material.

FIG. 2b illustrates a plastic layer 126 of such as ultra-high molecular-weight polyethylene (UHMWPE). As discussed previously, the plastic layer may be formed from plastic fibers that are bonded together through a resin, or another bonding material, such as through a gel-spinning processing. The plastic layer (e.g., UHMWPE, or the like) may be 10, 12, 15, 17, 20, or the like times stronger than steel and/or approximately twice as strong as other high strength polymers (e.g., Kevlar), but is also be light enough to float (e.g., approximately 20, 30, 40, 50 or the like lighter than Kevlar).

FIG. 2c illustrates aluminum foam sheets 142. The aluminum foam sheet 142 is porous with a plurality of apertures that create a sponge-like structure and is ultra-light weight, resulting in aluminum foam sheet 142 being able to float in water. The aluminum foam sheet 142 is non-flammable and does not emit any toxic gases. Moreover, the porosity of the aluminum foam sheet 142 (e.g., the air-filled voids in particular), provide acoustic absorption and electromagnetic shielding. The aluminum foam sheet 142 may be manufactured from recycled materials.

FIG. 2c illustrates a polyethylene, polystyrene, polyurethane, polycarbonate, or the like type filler layer 160, in accordance with some embodiments of the disclosure. The polyethylene, polystyrene, polyurethane, polycarbonate, or the like type filler layer 160 may provide insulation fire resistance, blast resistance, sound abatement, or other protective features to the composite door system 100.

In some embodiments the composite door system 100 may include a shell (otherwise described as door skin) in which the one or more layers 120 (e.g., each having the one or more fiber layers 122) and/or the additional layers (e.g., sheet 140, filler material 160, or the like) may be at least partially (or completely) enclosed within the shell. The shell may be made of any material, including but not limited to steel, aluminum, an alloy, plastic, wood, or any other like material.

It should be further understood, that depending on the desired application of the composite door system 100, there may be one or more additional layers that comprise of other materials, such as but not limited to water resistant or proofing layers, concreate layers, coatings, or the like depending on the operation and/or installation requirements for the composite door systems 100 and/or the barrier structures in which they may be used.

In some embodiments of the disclosure, the composite door systems 100 may include a window portion. The window portion may be transparent, semi-transparent, or non-transparent. The window portion may be described as a window, sidelight, transom, borrowed light, door light, sash window, roller window, louver, or any other like window portion. The window portion may be formed within the composite door system 100 during manufacturing of a new composite door system 100, or may be retrofit into an existing composite door system 100 on-site or after the composite door system has been installed and/or in use. The window portion may be damage resistant (e.g., projectile resistant, element resistant—wind, attack resistant, fire resistant, blast resistant, or the like). The window portion may be made from any type of material such as glass, acrylic, polycarbonate, laminate, other type of material, or combinations thereof in one or more layers. The window portion may itself be damage resistant or the window portion may have a glazed layer that is damage resistant. In some embodiments, the window portion may be ultra-light weight, such as formed from the ultra-high molecular-weight polyethylene (UHMWPE) described herein. As such, the window may have a UL level 1, 2, 3, 4, 5, 6, 7, 8, 9, 10, or the like rating. The window portion may be installed in the composite door system 100 before shipping to the installer, or it may be installed on site by the installer. Alternatively, the composite door systems 100 may be retrofitted with a window portion, that is, on-site, or within an installed composite door system 100 that is retrofitted after installation. Moreover, any window portions already installed within a composite door system 100 may be retrofitted with a glaze to improve the damage resistance of the window portion of the composite door system 100. The glaze may be made from a material that is the same as or similar to the materials of the window portion described above. Moreover, the glaze may be applied using any method, such as painted, heat sealed, applied as a sticker, or the like.

It should be understood that the composite door system 100 may be utilized in a number of different applications, such as in temporary structures, permanent structures, walls, partitions, or the like. As such, FIG. 3 illustrates a front view of a dwelling structure 40 (otherwise described as a "barrier structure"), in accordance with some embodiments of the disclosure. The dwelling structure 40 may refer to a building, house, etc. The dwelling structure 40 may comprise one or more walls 12 and one or more doors 14.

Barrier structures, such as dwellings, buildings, partitions, and the like, typically comprise doors, walls, panels, or the like, and in many instances, it is desirable that the barrier structures provide resistance to and protection from physical impacts from projectiles. The projectiles may occur due to debris from extreme weather (e.g., hurricanes, tornados, severe thunderstorms, typhoons, or the like). Alternatively, the projectiles may be ballistics from firearms, ordnance, explosive devices, or the like. In still other embodiments, the projectiles may be a result of explosions that could occur due to gas, chemicals, or other like explosive materials. In still other embodiments the projectiles may be a result destructive testing of products (e.g., crash testing of cars, blade out turbine testing, or performance testing of other products). Additionally, it may be desirable to have improved fire resistance, sound proofing, radiation protection, electromagnetic shielding, or the like.

Conventional FE (forced entry) and/or BR (bullet resistant) (otherwise described herein as FEBR) door openings use ballistic resistant materials such as steel BR armor, composite BR fiberglass, Kevlar, concrete and/or reinforced concrete, and may be used to form structures that provide at least some of the characteristics described above. However, conventional FEBR doors are not only extremely heavy, costly to transport, undesirably bulky and dangerous during shipping or should they fail during operation, but they also are potentially unable to provide the desired projectile resistance for the size of the door. In particular, conventional doors that are made for providing protection from projectiles (e.g., ballistic projectiles, extreme weather projectiles, or the like) could weigh between about 450-750 lbs., or more depending on the size, core type and steel gauges used. The weight not only makes manufacturing, shipping, and installing the doors difficult and dangerous, but it also causes problems when operating the doors.

For example, the conventional FEBR doors are difficult for a user to move, and they cause detrimental wear and tear to the hardware components of the door, such as the hinges, door opening mechanisms, etc. degrading the operation of the doors and/or requiring replacement of the hardware components. The weight of these doors makes the freight and shipping costs for transportation extremely high, in particular, when these doors are shipped long distances (e.g., thousand(s) of miles), and moreover, make it difficult to quickly build temporary structures in dangerous locations that provide projection from projectiles.

The composite door systems 100 of the present disclosure alleviates the foregoing deficiencies with conventional doors, and also provides additional advantages. For example, the composite door systems 100 of the present invention provide improved security, enhanced threat protection, and use of more sustainable materials to reduce weight, waste, lower the cost of ownership and the impact on the environment.

First, the composite door systems 100 of the present disclosure provides outstanding resistance to and protection from a variety of physical impacts by projectiles. In particular, even though the fiber layers 122 of the composite door system are extremely thin (e.g., about 0.02 inches thick), the fiber layers 122 (e.g., 30 fiber layers, 16 fiber layers, 14 fiber layers, 8 fiber layers, 6 fiber layers, 4 fiber layers, 2 fiber layers, or a single fiber layer, arranged in a stacked formations) are structured to provide various UL level protection from ballistic projectiles (e.g., firearm, or the like) and also protection from other projectiles such as debris or shrapnel. As such, the one or more projectile resistant layers 120, each comprising the one or more fiber layers 122 (e.g., fabric layer, plastic layers, or the like as discussed herein), may alone or in combination with other layers, provide a composite door system 100 that provides the desired FE (forced entry) and/or BR (Bullet Resistant) properties while providing reduced weights and/or improved shipping and/or installation processes. For example, the composite door systems 100 may have UL752 Level 1 (9 mm handgun) to UL 752 Level 10 (.50 Caliber Rifle) protection, and in particular embodiments UL752 level 1 (9 mm), UL752 level 2 (0.357 Magnum), UL752 level 3 (.44 Magnum), UL752 level 4 (0.30 Caliber Rifle), UL752 level 5 (7.63 Caliber Rifle) UL752 level 6 (9 mm Rifle), UL752 level 7 (5.56 mm), UL752 level 8 (7.62 mm), UL752 level 9 (0.30-06 rifle), UL752 level 10 (0.50 caliber rifle), or the like protection, or have protection that ranges between, overlaps, or falls outside of these levels of protection. Furthermore, the composite door systems 100 may also be rated to withstand 5, 10, 15, 20, 25, 30, 40, 50, 60, or the like minutes of simulated "mob" attack, or range between, overlap, or outside of these levels of protection. In some embodiments of the invention, the fiber layers 122 may be fabric layers of basalt woven fabric, other similar material. In some embodiments of the invention, the fiber layers 112 may be plastic layers of UHMWPE. In some embodiments of the invention, the one or more projectile resistant layers 120 may comprise other types of materials, such as, but not limited to Kevlar or other Bullet resistant fabrics (e.g., woven fabric, non-woven fabric, knitted fabric, other fabrics, or the like) or Bullet resistant plastic that provide the same or similar protection as described with respect to the fiber layers 122 above. The protective or filler layers and materials can be added separately, or may be bonded together using structural adhesives, resins, heat, mechanical or other similar means. Furthermore, the costs of the various layers of the composite door systems are about half the cost of conventional materials without adding bulk to the composite door systems (e.g., doors in which they are used).

Moreover, the sheet 140, such as a porous sheet (e.g., the aluminum foam, or the like), used in the composite systems is structured to exhibit electrical resistance (e.g., because it does not conduct electricity), provide electronic shielding from radio frequency and medium frequency waves, provide fire protection (e.g., because it is non-inflammable), and provide various other properties that conventional materials are not able to provide. In other embodiments, the sheet 140 may comprise a polycarbonate, SGG material, or other type of foam sheet.

Furthermore, the fill material 160 is described generally herein as providing additional material in order to fill out the thickness of the composite door system, and in some embodiments provide an insulated core to at least a portion of the composite door system 100. While the fill material 160 is generally described as being a polystyrene sheet or other type of structure (e.g., loose material, or the like), it should be understood that the fill material may be any type of material (e.g., lightweight, or the like), such as, but not limited to a polyisocyanurate, polyurethane, fiberglass, cellulose, mineral wool, kraft paper (e.g., structural, or the like), plastics, polycarbonates, vermiculite, perlite, cementitious foam (e.g., magnesium oxide, such as magnesium silicate), phenolic foam, or other like material. Regardless of the fill material 160, it may provide structural, protective, sound transmission prevention, fire resistance or fire proofing, or the like properties. In some embodiments the fill material 160 may also have projectile resistance (e.g., firearm, blast, weather related resistance—wind, projectile, or the like, mob attack) and/or may have other properties that provide chemical resistance, radio frequency resistance, electromagnetic resistance, or the like.

Because of the strength of the one or more fiber layers 122 that form the one or more projectile resistant layers 120, and potentially the use of the one or more sheet layers 140, the fill material 160 that is utilized to form the rest of the barrier system may be very light. As such, the composite door system 100 of the present disclosure (e.g., with the various layers described herein) is extremely light weight and is easily portable. While conventional materials (e.g., steel BR armor, BR fiberglass, or the like) used for walls and doors for providing resistance to projectiles weighs about 15.2 lbs./sq. ft., the composite door systems 100 of the present invention, at its heaviest configurations (e.g., using 30 fabric layers 122) weighs merely about 2.19 lbs./sq. ft. Typical configurations of the composite door systems 100 (e.g., using 8 fabric layers 122) may weigh approximately 1.44 lbs./sq. ft. Hence, the composite door systems 100 of the present disclosure are an order of magnitude lighter than conventional materials while still providing enhanced projectile protection. Weight reductions of the composite door systems 100 results in reduced freight costs (e.g., less fuel required, or the like), lowers cost of ownership, and reduces operator risk, wear and tear on hardware and installation/maintenance.

As an example, as discussed earlier, a door made from conventional projectile-resistive materials such as BR fiberglass, steel BR armor, or the like weighs about 450-750 lbs. However, the composite door systems 100 discussed herein at its heaviest configuration weighs merely about 226 lbs. (providing about 58% reduction in weight), while a composite door system 100 made out of a typical configuration weighs approximately 130 lbs. (providing about 76% reduction in weight). As such, it should be understood that the composite door systems 100 of the present invention may have a weight that is 80, 75, 70, 65, 60, 55, 50, 45, 40, 35, 30, 25, 20, 15, 10 or the like percent lighter that a traditional door system (e.g., made from steel BR armor, BR fiberglass, or the like) with all other things being equal (e.g., the size of the door, thickness of the door, door hardware, or the like).

The composite door systems 100 of the present disclosure are also about 20% stronger than conventional projectile-resistive materials (e.g., BR fiberglass, steel BR armor, or other like materials). As such, all things being equal (e.g., the size of the wall, door, thickness thereof, or the like) the composite door systems 100 of the present disclosure may be 5, 10, 15, 20, 25, 30, 35, 40, 45, 50, 60, or the like percent stronger than a corresponding concreate door systems. Furthermore, because the composite door systems 100 are extremely light weight, they may be shipped in greater quantities due to the reduced weight and installed and/or replaced (should a door need replacing) using smaller equipment (e.g., trucks, smaller cranes, or the like) than would be required with comparable doors (e.g., BR fiberglass doors, steel BR armor doors, or the like doors). Finally, the component layers and their arrangement within the composite door systems 100 are infinitely customizable based on the desired applications. That is, the number of projectile resistant layers 120, and the number of one or more fiber layers 122 within each of the projectile resistant layers 120 may be determined based on the types of projectiles to be resisted, the weight and size requirements of the barrier system, or the like as required for the particular installation.

The composite door systems 100 described herein provide flexibility for customized door configurations. For example, conventional FEBR designs and manufacturing methodology limit the ability to quickly and efficiently tailor the door design to standard or custom specifications, especially when multiple specialty protection performance levels for the door are required. The composite door systems 100 described herein provide specialty materials (e.g., fibers, polycarbonates, UHMWPE, metals, EPS, foam metal sheets, aluminum, minerals, woven fabrics, non-woven fabrics, and other similar protective materials) in varying layers and configurations in order to vary the core as well as the level of protection required to meet the specification or market need. Use of layered (e.g., hybrid alternate materials, or the like) reduces the need for single core solutions and/or single protection designs. As such, the layered core materials can be configured to reduce weight, provide structure (structural support), enhanced protections from projectiles (e.g., from hurricanes, tornados, ballistics, explosions, physical attacks, or the like), provide fire resistance, noise resistance, RFI/EMI radiation resistance, mold/mildew resistance, and/or insect and other environmental protection.

For example, various hybrid door cores (e.g., layered cores) can be pre-fabricated and pre-configured to provide a drop-in "specialty core" that can be portable and transferable for use at various manufacturing sites and/or incorporated into various door construction designs (e.g., tab and slot, center seam, hemmed edge, or the like door configurations). This optionality provides design flexibility and production capacity for manufacturing (e.g., within or across sites), and reduces capital equipment and development costs.

Furthermore, the composite door systems 100, as disclosed herein, utilize construction materials and alternate core materials, and are formed in a way that are environmentally friendly. For example, the materials of the shell and/or core may be made from recyclable and/or repurposed materials (e.g., 10, 20, 30, 40, 50, 60, 70, or the like percent recyclable and/or repurposed). Moreover, the steel used in the shell (otherwise described as a skin) may be made from recycled and/or repurposed materials (e.g., 10, 20, 30, 40, 50, 60, 70, 80, 90 or the like percent recycled and/or repurposed). Furthermore, the composite door systems 100 may replace conventional FEBR core materials and/or adhesives that are petroleum based or produced from materials that are less environmentally friendly. In some embodiments, the composite door systems 100 may meet UL Environmental/Sustainable Solutions for GREENGUARD and GREENGUARD Gold certification. Additionally, the composite door systems 100 may meet compliance and third party validation for Environmental Product Declarations (EPD), DECLARE labels, Living Building Challenge requirements, and/or compliance to California Prop65.

The composite door systems 100 described herein reduce the cost of the end product and manufacturing methodology, and moreover, the composite door systems 100 reduce the environmental and resource costs when compared to conventional FEBR doors.

As previously discussed herein, and as illustrated in FIG. 4a, the layers may be provided within a shell 200 (otherwise described as skins). The shell 200 of the composite door system 100 may comprise a first face 202 (e.g., a front face), a second face 204 (e.g., a rear face), a first side 206 (e.g., a right side), a second side 208 (e.g., left side 208), a bottom side 210 (e.g., a lower side), and/or a top side 212 (e.g., an upper side). It should be understood that the first face 202, the second face 204, the first side 206, the second side 208, the bottom side 210, and/or the top side 212 may be members that are operatively coupled together (e.g., separate members that coupled together, members that are integrally formed together, and/or the like). The shell may be any type of material, but in some embodiments the shell may be 24, 22, 20, 18, 16, 14, 12, 10, 8, or other like gauge metal (or range between, overlap, or fall within any of these values).

As illustrated in FIGS. 4a and 4b, the shell 200 (or otherwise described as skin(s)) of the composite door system 100 may have one or more hardware housings 220, cables (PoE, Electro Lynx, or the like), reinforcements, or the like, which may be located within any location of the composite door system 100 depending on the type of hardware and/or the location of such hardware. In some embodiments the hardware housings 220 may be cases, boxes, plates, or the like that are located anywhere on the door (e.g., anywhere on the faces, between the faces, on the sides, near the sides, on the top or bottom, near the top or bottom, or the like). In some embodiments, the hardware housings 220, may comprise the members of the sides 206, 208, 210, 212 of the shell 200, a solid hardware housing, a cased hardware housing, a tubular hardware housing, and/or the like that are operatively coupled to (e.g., within, butted against, or the like) the shell 200. For example, the hardware housings 220 may run adjacent the entirety, or a portion thereof, of a side of the composite door system 100, such as along the first side 206. This location may allow for locating a locking mechanism (e.g., a mortise lock, elongated bar lock, door knob, door lever, or the like). In some embodiments, housings 220 may have open at a side (e.g., a first side) in order to allow for installation of a lock body, deadbolt, hinge, door system, or the like (e.g., open area, open channel, or the like). Moreover, as illustrated in FIG. 4a the hardware housings 220 may be located along different positions adjacent the first side 206, second side 208, the bottom side 210, and/or the top side 212. These locations may allow for locating a locking mechanism in different locations along the edges (e.g., first side 206, second side 208, or the like) and/or allow for the attachment of different types of handles (e.g., panic exit handles and locking mechanisms, such as L-shaped pivoting handles, or the like). Moreover, as illustrated in FIG. 4a, including a hardware housing 220 adjacent the bottom side and/or top side 212 of the composite door system 100 may allow for operative coupling of a door closer or door operator (e.g., collectively door control system), a floor lock, a wall or frame lock, or the like. Furthermore, the hardware housings 220 may provide additional protection around the hinges (e.g., along a second side 208). It should be further understood that the hardware housings 220 may be located adjacent any side of the composite door system 100 and/or within the composite door system 100 (e.g., in the interior away from the edges, or the like) in order to protect the hardware from projectiles or provide other damage resistance. Furthermore, the one or more hardware housings 220 provide locations through which conduit and/or cables run in order to provide electrified hardware (e.g., electronic locking system, electronic door system, electronic hinges, or the like).

The one or more layers described herein typically provide protection from projectiles or other damage, and the hardware may be located within the composite door system 100 at locations that may not be thick enough to provide the desired protection. As such, the hardware housings 220 may be utilized to provide the desired protection at these locations. Therefore, regardless of the type of hardware housing 220, it may be made of a material and/or have a thickness that provides different levels of damage resistance (e.g., projectile resistance, attack resistance, or the like). For example, the hardware housings 220 may be made from armored plating, from one of or more of the layers of the materials discussed herein (e.g., extra layers of the projectile resistant material that form the projectile resistant layer 120), or the like. For example, more layers of the projectile resistant material (or specifically the fiber layers 122, such as the fabric layers, the plastic layers, or the like) may be provided at the hardware housing 220 location than may be located in the other areas of the composite door system 100, such as the areas that do not have hardware housings 220. The additional projectile resistant material may be done in order to make up for any projectile resistance that is lost by the removal of the other layers due to the thickness of the hardware for the door. For example, the hardware housings 220 may provide UL level 1, 2, 3, 4, 5, 6, 7, 8, 9, 10, or the like protection from projectiles, as previously described herein.

FIGS. 4c, 4d, and 4e illustrate different types of door configurations for the composite door system 100. However, it should be noted that the composite door system 10 may be utilized with other types of door configurations not specifically illustrated herein. FIG. 4c illustrates an example of a hemmed shell 300 (e.g., a first face 202 and an integral first side 206 of a hemmed shell 300). Hemmed shells 300 (e.g., for hemmed doors) may include a hemmed edge 302 with a visible edge seam or a seamless edge. A second face 204 of the hemmed shell 300 is configured to be operatively coupled with the first face 202 through the hemmed edge 302 (e.g., male and female configuration, keyed configuration, or the like). Alternatively, FIG. 4d illustrates an example of a butted shell 310 (e.g., for butted doors). In the butted shell 310 a first face 202 and portion of the first side 206 is operatively coupled (e.g., in a butted configuration) against a second face 204 and a portion of the first side 206. The butted shell 310 is available with a visible edge seam or a seamless edge. FIG. 4e illustrates an example of a rabbet shell 320. The rabbet shell 320 (e.g., for rabbet doors) may be utilized as a single door for used with a door frame or between double doors. The rabbet shell 320 may have a first face 202 that is integral with a first side 206 and is operatively coupled with a second face 204 such that the rabbet shell 320 has rabbet edge 322 extending away from the rabbet shell 320 in order to overlap with a notch in an adjacent frame or door. In other embodiments custom edges may be utilized in the shell 200.

Regardless of the type of shell 200 being used the shell 200 may have interlocking, hemmed, hairline, or other like seams on vertical edges, and in some embodiments no visible seams on the faces 202, 204. The shell 200 may be formed of any type steel (e.g., colled-rolled steel, galvanized, stainless, or the like steel), or other materials, and may be made from gage 10, 12, 14, 16, 18, 20, 22, 24, or the like gage steel, or otherwise range between, overlap, and/or fall outside of any of the forgoing values.

FIG. 4f illustrates the composite door system 100 in some embodiments, in which one or more support members 230 may be utilized within the shell 200 to form a reinforced core (e.g., reinforced laminate core). The one or more support members 230 may be vertical support members (as shown), horizontal support members (not illustrated), angled support members (not illustrated), or the like. The one or more support member 230 may provide additional structural support for the composite door system 100. For example, as illustrated in FIG. 4f the composite door system 100 may comprise a shell 200 as previously discussed with respect to FIGS. 4a and 4b. In some embodiments the one or more support members 230 may be operatively coupled to the first face 202 and/or the second face 204 to provide additional support to the composite door systems 100. The one or more support members 230 may be any type of shape, including, but not limited to z-shaped, c-shaped, L-shaped, truss shaped, corrugated shaped, tubular shaped (e.g., circular, oval, square, rectangular, or the like), non-uniform shape, or any other like shape. In some embodiments, as illustrated in FIG. 4f, the support members 230 may be 22 gage z-shaped stamped steel members 232; however, it should be understood that any gage steel may be utilized (e.g., 10, 12, 14, 16, 18, 20, 22, 24, or the like, or otherwise range between, overlap, and/or fall outside of any of the forgoing values). In some embodiments, the support members 230 may be placed no more than 6 inches apart; however, in some embodiments, the support members may be placed 1, 2, 3, 4, 5, 6, 8, 10, 12, 16, 20, 24, or the like inches apart, or otherwise range between, overlap, and/or fall outside of any of the forgoing values. The one or more support members 230 may be operatively coupled to the first face 202 and/or second face 204 through the use of a coupling, such as welds, fasteners (e.g., bolts, rivets, screws, or the like), adhesive, tape, epoxy, or other like couplings.

It should be further understood that in some embodiments the first face 202 and/or the second face 204 may be further supported by a liner 240 (e.g., steel sheet stiffener, or the like). As such, in some embodiments the one or more support members 230 may be operatively coupled to the liner which is operatively coupled to the first face 202 and/or second face 204. The couplings used to operatively coupled the liner 240 to the one or more support members 240 may be any of the couplings previously described herein.

Moreover, one or more layers of projectile resistant material may be located between the first face 202 and/or the second face 204 and the one or more support member 230. In some embodiments, the one or more layers of projectile resistant material may be located between the first face 202 and/or the second face 204 and a liner 204. In the embodiments that utilize one or more liners 240, the liners 240 may hold the one or more layers of the projectile resistant material between the first face 202 and the liner 240 and/or the second face 204 and the liner 240. As previously discussed herein, the one or more layers of projectile resistant material may comprise the one or more fiber layers 122 (e.g., one or more fabric layers, plastic layers, or the like) previously discussed herein. However, in other embodiments other types of BR sheets may be utilized. Alternatively, or additionally, the one or more layers of projectile resistant material may be located between the one or more support members 230 to provide the projectile resistance (e.g., with or without the one or more layers between the first face 202 and/or second face 204 and the one or more support members 230 or liners 240).

In some embodiments, the sheet 140 and/or fill material 160 previously discussed herein may be utilized between the first face 202 and/or the second face 204 and the one or more support members 230 as described above with respect to the one or more fiber layers 122 or other projectile resistant materials. Alternatively, or additionally, the sheet 140 and/or fill material 160 previously discussed herein may be located within the cavities between the adjacent one or more support members 230 to provide the benefits previously discussed herein. In some embodiments, a foam-in-place polyurethane, or other type of material (e.g., solid, liquid hardening material, or loose fill material) may fill the cavities between the first face 202, the second face 204, and/or between the one or more support members 230. In some embodiments, the fill material 160 may chemically bond to the interior surfaces within the shell 200. In other embodiments, in addition to, or instead of, the foam-in-place injected polyurethane core, other core materials may be utilized, such as fiberglass matte, polystyrene, polyisocyanurate, cementitious, mineral wool, mineral core, or the like.

FIGS. 4g, 4h, and 4i illustrate other embodiments of the invention which instead of utilizing z-shaped support members 232 (as illustrated in FIG. 4f), the one or more support members 230 may be tubular support members 234 (e.g., spindles). For example, the tubular support members 234 may comprise square shaped (or any other shaped) reinforcements which may be 0.2, 0.3, 0.4, 0.5, 0.6 or the like inches, or may range between, overlap, or fall outside of these values. Moreover, as illustrated in FIGS. 4h and 4i, the liner 240 (e.g., steel sheet, or the like) may be eliminated. As such, the one or more layers of projectile resistant material, such as the one or more fiber layers 122 discussed herein, may be located between the one or more tubular support members 234 and the first face 202 and/or the second face 204, and/or between adjacent one or more tubular support members. Furthermore, as previously described with respect to FIG. 4f, the sheet material 140 and/or the fill material 160 (e.g., foam-in-place polyurethane, or other fill material discussed herein) may be utilized between the first face 202 and/or the second face 204 and the tubular members 234 and/or in the cavities between adjacent tubular members 234. As illustrated in FIG. 4i, the composite door system 100 may comprise a first face 202, one or more first projectile resistant layers (e.g., one or more first fiber layers 122), one or more first liners 240, one or more first sheet layers 140 and/or one or more first fill materials 160, one or more support members 230, one or more second first sheet layers 140 and/or one or more second fill materials 160, one or more second liners 240, one or more second projectile resistant layers (e.g., one or more second fiber layers 122), and a second face 204.

Regardless of how the core of the composite door systems 100 are utilized, it should be understood that in some embodiments the composite door systems 100 are created and installed in accordance with the composite door system manufacturing and assembly process 400, as illustrated in FIG. 5. As illustrated by block 410 in FIG. 5, the members for the shell 200 of the composite door system are created, for example, by cutting (e.g., using a shears, lasers, water, or the like cutting devices), stamping (e.g., stamping, cold forming, pressing, or the like), or other like method of creating the desired members.

Block 420 of FIG. 5 further illustrates that at least a portion of the shell 200 of the composite door system 100 is formed. For example, the members are operatively coupled together, such as by bending portions of the members (e.g., bending the portions to create one or more of the sides and/or faces from a single member) and/or using a connector (e.g., welding, using a fastener—bolt, rivet, screw, clamp, bracket, shearing of lapped portions of the shell, or the like) to operatively coupled two or more members together.

FIG. 5 further illustrates in block 430 that the one or more hardware housings 220 and the shell 200 are operatively coupled together in one or more locations. As previously discussed herein, the hardware housings 220, may comprise the members of the sides of the shell 200, a solid hardware housing, a cased hardware housing, a tubular hardware housing, and/or the like that are operatively coupled to (e.g., within, butted against, or the like) the shell 200. As previously described herein, the hardware housings 220 are used to secure the hardware for the composite door system 50. Moreover, once the hardware housings 220 are operatively coupled to the shell 200, the hardware may be operatively coupled to the composite door system 100. For example, channel members (e.g., channel hardware housing), the solid hardware housings (e.g., which may be machined to receive the hardware), the case hardware housings, and/or the tubular hardware housings, may be prepared to receive the hardware assembled to the composite door system 100. It should be understood that the hardware may be operatively coupled to the hardware housings 220 at this point before the core with the various layers are added to the composite door system 100, or alternatively, the hardware may be assembled after the core with the various layers is assembled in the factory, at another facility, on-site, or the like. It should be understood when assembling the hardware housings 220 and/or the hardware to the shell 200 additional projectile resistant material (e.g., projectile resistant layers 120), additional steel, or the like may be operatively coupled to the shell 200, the hardware housings 220, or the like.

Block 440 of FIG. 5 illustrates that the core with the various layers (e.g., projectile resistant layer 120, sheet layer 130 (e.g., porous sheet), and/or fill material layer 140, as previously described herein, may be selected or created. In some embodiments the core may be pre-created for mass manufacturing in order to reduce costs and replicate the core assembly process. As such, pre-formed cores may be selected and assembled into the shell 200 based on the desired implantation. Alternatively, customized cores may be created based on a particular application for a specific customer. Regardless of the type of core being used, the core may be operatively coupled together and to the shell as previously described herein (e.g., couplings, such as fasteners, ties, adhesives, press-fit, laid within, slid into from the top or bottom, or the like). It should be understood that dependent on the location of the hardware within the shell 200 and/or the size of the core, the shell 200 may be filled with two or more portions of the core (e.g., the core may be spilt into sections of the same or different thickness) laid next to each other and/or on top of each other.

FIG. 5 further illustrates in block 450, that one or more of the side 206, 208, 210, 212 and/or the faces 202, 204 are operatively coupled together, as previously discussed with respect to block 420, to complete the shell 200 with the core located inside.

Block 460 illustrates that the composite door system 100 is shipped to the location at which the dwelling structure 40 is to be assembled and/or installed using the composite door system 100. Since the composite door system 100 are lighter than conventional doors that provide projectile resistance, the shipping weight is much less than conventional doors that utilize fiberglass, Kevlar, concrete, or other types of projectile material. In this way, manufacturing and shipping costs are greatly reduced.

FIG. 5 further illustrates in block 470 that the composite door systems 100 and/or other components (e.g., structural members, panels, or the like) are assembled together in order to create the dwelling structure 40.

It should be understood that any combination of the layers, such as the one or more fiber layers 122, other projectile resistant layers, the sheet layers 140, the fill material 160, support members 230, liners 240, and/or other like layers may be mixed and matched as needed for different applications. Moreover, any of the layers and/or combinations thereof described herein may be utilized in a shell 200. As such, the composite door systems are infinitely customizable and configured to be adapted to a variety of applications, and scalable levels of protection. The layers may be formed into the shell 200 as the composite door system 100 is being manufactured. Alternatively, the layers may be formed into a core that is then later dropped into an existing shell 200. For example, the core may be manufactured in a facility and shipped to a door manufacturer, warehouse, on-site (e.g., during new construction, as a retrofit option, or the like), or to another like facility, and dropped into a door shell 200 located at the manufacturer, warehouse, on-site, or the like. The core dropped into the shell 100 may be operatively coupled to the shell using any type of couplings (e.g., adhesives, tapes, fasteners, epoxy, or the like), as previously discussed herein. Furthermore, while the shell 200 described herein is discussed specifically for composite doors systems 100, it should be understood that the same layer configurations, systems, and/or processes may be utilized for any type of panel within a barrier structure 40. For example, instead of, or in addition to, using the layered core in a composite door system 100, the layered core may be utilized within a panel (e.g., wall of a building, wall of an open air structure, barrier, or the like) of any barrier structure 40 in order to provide the desired projectile resistance or force entry resistance for the barrier (e.g., walls and doors).

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "top," "bottom," "side," "distal," "proximal," "upper," "lower," "left," "right," "horizontal," "vertical," "upward," and "downward", or other like terminology merely describe the configuration shown in the figures. The referenced components may be oriented in an orientation other than that shown in the drawings and the terminology, therefore, should be understood as encompassing such variations unless specified otherwise. It will be understood that when an element is referred to as "operatively coupled" to another element, the elements can be formed integrally with each other, or may be formed separately and put together. Furthermore, "operatively coupled" to can mean the element is directly coupled to the other element, or intervening elements may be present between the elements. Furthermore, "operatively coupled" may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A composite door system for a building, the system comprising:
 a shell having a front face, a rear face, a first side, a second side, a top side, and a bottom side;
 a pre-fabricated composite core, comprising:
  a fill material, wherein the fill material provides sound abatement;
  one or more support members; and
  one or more support member couplings for operatively coupling the one or more support members to the fill material, wherein the one or more support member couplings at least comprise support member adhesive between the one or more support members and fill material;

wherein the one or more support members are at least partially located within the fill material to provide structural support to reinforce the pre-fabricated composite core;

one or more core couplings that operatively couple the pre-fabricated composite core to the shell, wherein the one or more core couplings at least comprise core adhesive between the front face or rear face and the pre-fabricated core;

wherein the pre-fabricated composite core is formed before being assembled to the shell with the one or more core couplings.

2. The composite door system of claim 1, wherein the pre-fabricated composite core further comprises:

a projectile resistant layer comprising one or more ultra high molecular weight polyethylene (UHMWPE) layers.

3. The composite door system of claim 2, wherein the UHMWPE layer comprises one or more UHMWPE sheets of UHMWPE fibers bonded together by a bonding material or one or more woven fiber UHMWPE layers.

4. The composite door system of claim 2, wherein the UHMWPE layer comprises UHMWPE fibers and cementitious material.

5. The composite door system of claim 2, wherein the UHMWPE layer comprises UHMWPE fibers and cementitious fill liquid that hardens into a solid.

6. The composite door system of claim 1, wherein the pre-fabricated composite core further comprises:

a projectile resistant layer comprising one or more fabric layers.

7. The composite door system of claim 6, wherein the one or more fabric layers are formed from a solid mineral material.

8. The composite door system of claim 7, wherein the solid mineral material is formed from basalt.

9. The composite door system of claim 6, wherein the one or more fabric layers are formed from aromatic polyamide fibers.

10. The composite door system of claim 1, further comprising one or more additional layers comprising one or more sheet layers of a porous foam sheet.

11. The composite door system of claim 1, wherein the one or more support member couplings or the one or more core couplings further comprise fasteners, epoxy, or welds.

12. The composite door system of claim 1, wherein the fill material is a polystyrene, polyisocyanurate, polyurethane, fiberglass, cellulose, mineral wool, structured kraft paper, plastics, polycarbonates, vermiculite, perlite, cementitious foam, or phenolic foam material.

13. The composite door system of claim 1, wherein the fill material comprises a foam-in-place material that hardens to create one or move cavities in which at least a portion of the one or more support members are located before the pre-fabricated composite core is operatively coupled to the shell.

14. The composite door system of claim 1, further comprising:

one or more hardware housings operatively coupled to the shell before assembly of the pre-fabricated composite core.

15. The composite door system of claim 1, wherein the one or more support members comprise a plurality of support members spaced apart at least partially within the fill material.

16. The composite door system of claim 1, wherein the one or more support members comprise one or more corrugated shaped support members with the fill material located at least between corrugations of the one or more corrugated shaped support members.

17. The composite door system of claim 14, further comprising:

one or more projectile resistant materials operatively coupled to the one or more hardware housings, wherein the one or more projectile resistant materials comprise steel or one or more additional fiber layers.

18. The composite door system of claim 1, wherein the one or more support members comprise z-shaped, c-shaped, tubular shaped, or L-shaped support members.

19. A pre-fabricated composite core, the pre-fabricated composite core comprising:

a fill material, wherein the fill material provides sound abatement;

one or more support members; and one or more support member couplings for operatively coupling the one or more support members to the fill material, wherein the one or more support member couplings at least comprise support member adhesive between the one or more support members and fill material;

wherein the one or more support members are at least partially located within the fill material to provide structural support to reinforce the pre-fabricated composite core;

wherein the pre-fabricated composite core is configured to be assembled to a shell of a composite door system after being formed through one or more core couplings, wherein the shell comprises a front face, a rear face, a first side, a second side, a top side, and a bottom side, and wherein the one or more core couplings at least comprise core adhesive between the front face or rear face and the pre-fabricated core.

20. A method of forming a composite door system, the method comprising:

forming at least a portion of a shell;

assembling a pre-fabricated composite core, wherein the pre-fabricated composite core comprises:

a fill material, wherein the fill material provides sound abatement;

one or more support members; and one or more support member couplings for operatively coupling the one or more support members to the fill material, wherein the one or more support member couplings at least comprise support member adhesive between the one or more support members and fill material;

wherein the one or more support members are at least partially located within the fill material to provide structural support to reinforce the pre-fabricated composite core; and assembling the pre-fabricated composite core to the shell using one or more core couplings, wherein the shell comprises a front face, a rear face, a first side, a second side, a top side, and a bottom side, and wherein the one or more core couplings at least comprise core adhesive between the front face or rear face and the pre-fabricated core.

* * * * *